(12) United States Patent
Sultenfuss et al.

(10) Patent No.: US 9,458,709 B2
(45) Date of Patent: Oct. 4, 2016

(54) HEAVY OIL PRODUCTION WITH EM PREHEAT AND GAS INJECTION

(71) Applicants: ConocoPhillips Company, Houston, TX (US); Harris Corporation, Melbourne, FL (US)

(72) Inventors: Daniel R. Sultenfuss, Houston, TX (US); Richard Treinen, Bartlesville, OK (US); Mark A. Trautman, Melbourne, FL (US)

(73) Assignees: ConocoPhillips Company, Houston, TX (US); Harris Corporation, Melbourne, FL (US)

( * ) Notice: Subject to any disclaimer, the term of this patent is extended or adjusted under 35 U.S.C. 154(b) by 337 days.

(21) Appl. No.: 13/729,474

(22) Filed: Dec. 28, 2012

(65) Prior Publication Data

US 2013/0199774 A1    Aug. 8, 2013

Related U.S. Application Data

(60) Provisional application No. 61/584,963, filed on Jan. 10, 2012, provisional application No. 61/592,366, filed on Jan. 30, 2012.

(51) Int. Cl.
*E21B 43/24* (2006.01)
*E21B 43/16* (2006.01)

(52) U.S. Cl.
CPC ......... *E21B 43/2401* (2013.01); *E21B 43/164* (2013.01); *E21B 43/168* (2013.01); *E21B 43/2403* (2013.01); *Y02P 90/70* (2015.11)

(58) Field of Classification Search
CPC ........ E21B 43/16; E21B 43/24; E21B 43/24; E21B 43/2403; E21B 43/2406
USPC .................................. 166/272.1, 302, 248
See application file for complete search history.

(56) References Cited

U.S. PATENT DOCUMENTS

| | | | |
|---|---|---|---|
| 3,106,244 A | 10/1963 | Parker | |
| 4,148,359 A * | 4/1979 | Laumbach | E21B 43/243 166/261 |
| 2003/0141073 A1 | 7/2003 | Kelley | |
| 2006/0289157 A1* | 12/2006 | Rao | E21B 43/164 166/268 |
| 2008/0142230 A1 | 6/2008 | Lau | |
| 2010/0065265 A1* | 3/2010 | Kasevich | 166/248 |
| 2010/0243249 A1* | 9/2010 | Fang | E21B 43/2406 166/272.3 |
| 2010/0294488 A1 | 11/2010 | Wheeler | |
| 2010/0294489 A1* | 11/2010 | Dreher et al. | 166/248 |
| 2011/0061868 A1* | 3/2011 | Bailey | 166/272.3 |
| 2011/0247807 A1* | 10/2011 | Harris et al. | 166/272.1 |
| 2011/0253363 A1* | 10/2011 | Banerjee et al. | 166/248 |
| 2012/0103635 A1* | 5/2012 | Sanders et al. | 166/402 |

FOREIGN PATENT DOCUMENTS

GB         2479195         10/2011
WO  PCT/US2012/071948    2/2013

* cited by examiner

*Primary Examiner* — Brad Harcourt
(74) *Attorney, Agent, or Firm* — Boulware & Valoir

(57) ABSTRACT

An enhanced oil recovery technique that combines gas injection with EM radiation to heat and mobilize heavy oil at least until fluid communication is achieved.

23 Claims, 12 Drawing Sheets

VISCOSITY OF OIL IS REDUCED PROVIDING MORE EFFICIENT MISCIBLE DISPLACEMENT

SCHEMATIC PORTRAYS ONE WELL DURING THE THREE PHASES OF THIS PROCESS

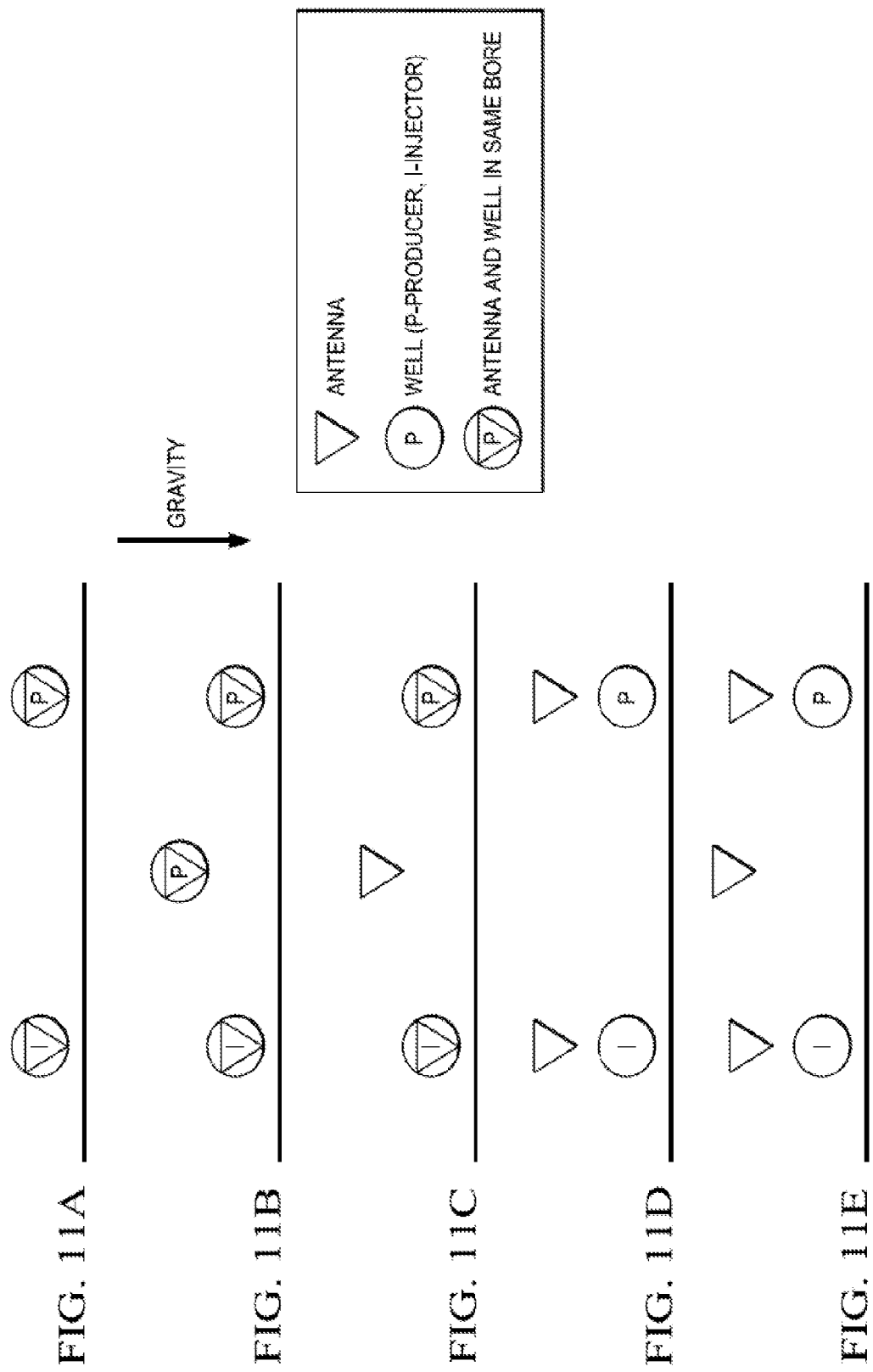

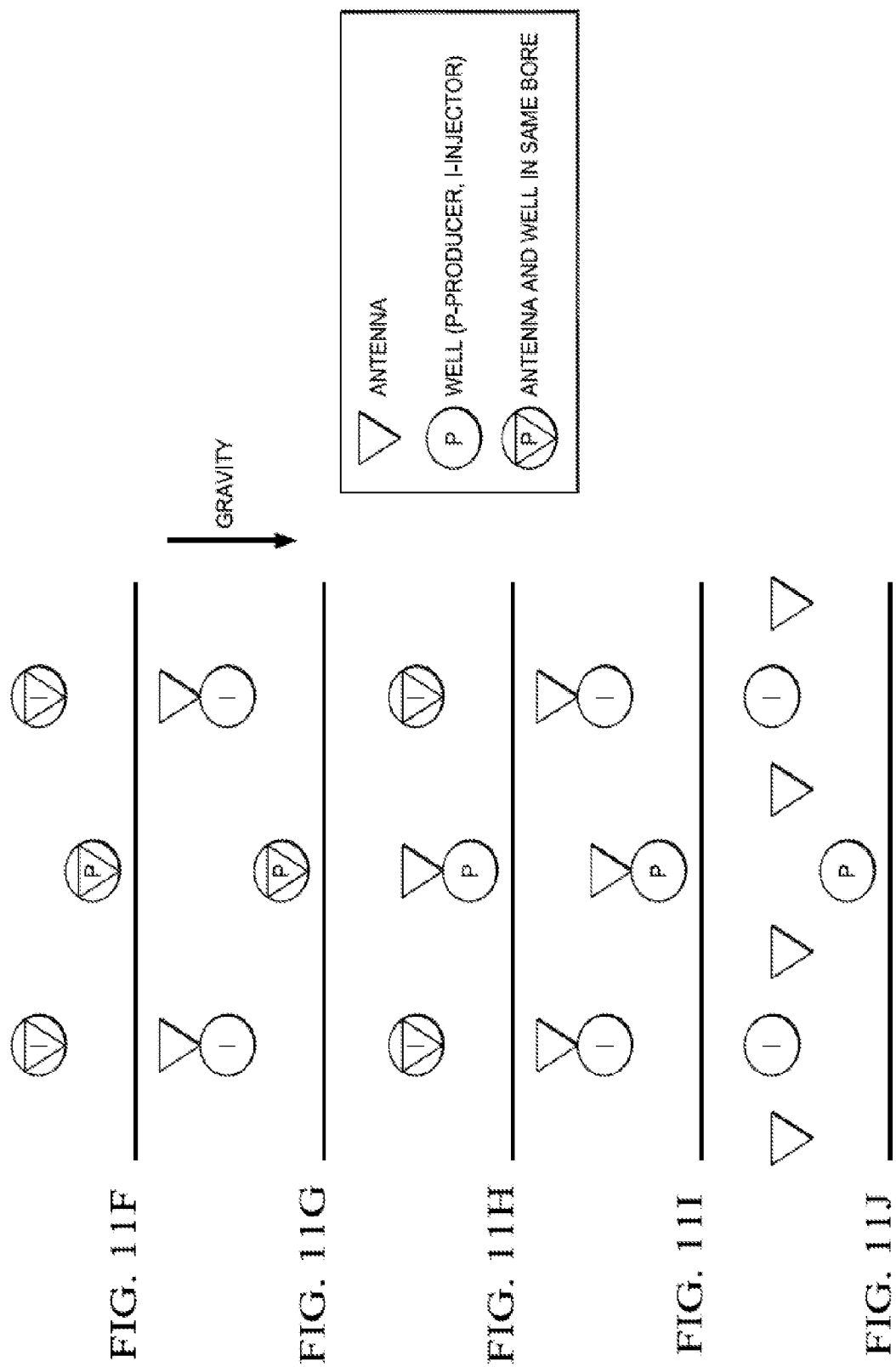

HEAVY OIL PRODUCTION WITH EM PREHEAT AND GAS INJECTION

PRIOR RELATED APPLICATIONS

This application claims priority to 61/584,963, filed Jan. 10, 2012, and also to 61/592,366, filed Jan. 30, 2012, each of which are incorporated by reference in its entirety herein.

FEDERALLY SPONSORED RESEARCH STATEMENT

Not applicable.

FIELD OF THE INVENTION

This invention relates to methods of enhanced oil recovery that combines gas drive mechanisms with RF mobilization of hydrocarbon deposits.

BACKGROUND OF THE INVENTION

With increasing global demand for oil and its byproducts, extracting oil from geological formations that are increasingly more difficult to reach has become necessary. One remaining source of petroleum are the heavy oils. In fact, the reserves of heavy oil in the world are more than twice those of conventional light crude oil.

Heavy crude oil or extra heavy crude oil is any type of crude oil that does not flow easily. It is referred to as "heavy" because its density or specific gravity is higher than that of light crude oil. Heavy crude oil has been defined as any liquid petroleum with an API gravity less than 20°. Extra heavy oil is defined with API gravity below 10.0° API (i.e. with density greater than 1000 $kg/m^3$ or, equivalently, a specific gravity greater than 1).

The production of heavy oil and bitumen from subsurface reservoirs such as oil sands or shale oil is challenging, and the main reason for the difficulty is the extreme viscosity of the heavy oil or bitumen in the reservoir. At reservoir temperatures, the initial viscosity of the oil is often greater than one million centipoises, which is difficult to produce if not first mobilized using external heat and/or solvent. Therefore, the removal of oil from the reservoir is typically achieved by introducing sufficient energy into the reservoir to heat the reservoir, such that the viscosity of the oil is reduced sufficiently to facilitate mobilization and production, or by injecting solvents to thin the oil, or by combinations thereof. Heat can be added in a number of ways, including injecting steam into the reservoir, in situ combustion or electric or electromagnetic heating methods. Solvent can be added by gas or liquid injections.

Gas reinjection is presently a commonly used approach to enhance recovery. There are two major types of gas injection—miscible gas injection and immiscible gas injection. In miscible gas injection, the gas is injected at or above minimum miscibility pressure (MMP), which causes the gas to be miscible in the oil, thus thinning it. In immiscible gas injection, by contrast, flooding by the gas is conducted below MMP. This low pressure injection of gas is used to maintain reservoir pressure to prevent production cut-off and thereby increase the rate of production.

Low pressure immiscible techniques can be categorized as follows:

Gas Pressure Drive:

Gas or other fluid can be injected into the formation merely to maintain the pressure drive. This traditional step for increasing oil recovery involves the injection of fluid into (or near) an oil reservoir for the purpose of delaying the pressure decline during oil production. Pressure maintenance can significantly increase the amount of economically recoverable oil over that to be expected with no pressure maintenance.

Gas Cap Drive:

a common variation on gas drive pressure support processes, wherein an upper "cap" of gas maintains pressure while oil gravity drains to lower production wells.

High pressure miscible injection processes can be broken down into the following techniques:

Liquefied Petroleum Gas Miscible Slug.

Displacement by miscible slug usually refers to the injection of some liquid solvent that is miscible upon first contact with the resident crude oil. In particular, this process uses a slug of propane or other liquefied petroleum gas (2 to 5% pore volume or "PV") tailed by natural gas, inert gas, and/or water. Thus, the solvent will bank oil and water ahead of it and fully displace all contacted oil.

Enriched Gas Miscible Process.

In the enriched gas process, a slug of methane enriched with ethane, propane, or butane (10 to 20% PV) and tailed by lean gas and/or water is injected into the reservoir. When the injected gas contacts virgin reservoir oil, the enriching components are slaked from the injected gas and absorbed into the oil.

High Pressure Lean Gas Miscible Process.

This process involves the continuous injection of high pressure methane, ethane, nitrogen, or flue gas into the reservoir. The lean gas process, similar to enriched gas, involves multiple contacts between reservoir oil and lean gas before forming a miscible bank. But, there is a difference in the enriched gas process where light components condense out of the injected gas and into the oil, then intermediate hydrocarbon fractions (C2 to C6) are stripped from the oil into the lean gas phase.

Gases that are used in these various gas injection techniques include $CO_2$, natural gas, nitrogen, ethane, butane, propane, flue gas and the like. Air is usually not used to repressurize conventional reservoirs because of the possibility of fire, but can be used to flood oil sands due to the low temperature of the formation and slow burning nature of the bitumen, although gas injectivity must first be established as the bitumen and other heavy oils are too viscous for gas injection methods.

Oil displacement by carbon dioxide injection relies, in part, on the phase behavior of the mixtures of the gas and the crude, which are strongly dependent on reservoir temperature, pressure and crude oil composition. These mechanisms range from oil swelling and viscosity reduction for injection of immiscible fluids (at low pressures) to completely miscible displacement in high-pressure applications. In these high pressure applications, more than half and up to two-thirds of the injected $CO_2$ returns with the produced oil and is usually re-injected into the reservoir to minimize operating costs. The remainder is trapped in the oil reservoir by various means.

Nitrogen has also been successfully used as the injection fluid for EOR and widely used in oil field operations for gas cycling, reservoir pressure maintenance, and gas lift. The costs and limitations on the availability of natural gas and $CO_2$ have made nitrogen an economic alternative for oil recovery by miscible gas displacement. Nitrogen is usually cheaper than $CO_2$ or a hydrocarbon derived gas for displacement in EOR applications and has the added benefit of being non-corrosive. On the other hand, in some cases methane and $CO_2$ are readily available, and the use of $CO_2$ also allows the possibility of reducing the carbon footprint and/or allowing carbon sequestration. Thus, the choice of gases used will vary based on economics and ecological impact, as well as on reservoir conditions.

The concept of injecting gas into a formation to stimulate recovery of residual oil is therefore not new. Successful laboratory gas-injection experiments generated a lot of optimism in the 1950s, but by the 1970s field experiments yielded only moderate recoveries of 5% to 10% of the remaining original oil in place (OOIP) after the initial drive mechanisms had been exhausted. Viscous fingering, solvent channeling, and reservoir heterogeneity were found to be the main culprits for disappointing field performances.

Electromagnetic energy has also been used in various industries for a number of years, including in enhanced oil recovery techniques. Applications can be divided into two or three categories based on the frequency of the electrical current used in downhole mobilization techniques. The first is low frequency heating and the second is high frequency, and each is discussed in turn.

Low frequency currents (less than 60 Hz) are used in electric resistive heating or "ERH." In ERH mode it is assumed that resistance heating dominates the process and other factors are negligible. Here the depth of penetration is high, but the intensity low. Low-frequency heating is limited by water vaporization near the wellbore, which breaks the conductive path to the reservoir, and limits the heating rate as well as the resulting production rates.

In high frequency heating, herein called EM heating or EMH, currents are used in microwave (MW) or radio frequency (RF) frequency range. In this high frequency range, dielectric heating prevails, and the dipoles formed by the molecules tend to align with the electric field. The alternation of this field induces a rotational movement on the dipoles, with a velocity proportional to the frequency of alternation. In this instance, heating is produced by the absorption of electromagnetic energy by the polar molecules in the formation; hence, the amount of heat absorbed will depend on the adsorption coefficient of the medium.

EM heating is relatively independent of the thermal conductivity of the oil sand and reservoir heterogeneity. EM heating does not require a heat transporting fluid such as steam or a hot fluid injection process, which avoids the complications associated with generating and transporting a heated fluid, and allows it to be applied in wells with low incipient injectivity. EM heating can also apply to situations where generating and injecting steam may be environmentally unacceptable. Furthermore, a single well can be used to introduce energy to the formation through a power source as well as to recover produced fluids. Production may occur during or immediately after EM heating if the formation pressure is large enough. All of the above are only some of the advantages of EM heating as a recovery method for heavy oil reservoirs with respect to the conventional thermal processes.

Another high frequency based method of heating hydrocarbon deposits is inductive heating, where alternating current flowing through a set of conductors induces a magnetic field in the surrounding medium. The variation of the magnetic field, in turn, induces secondary currents, whose circulation in the medium generates heat. However, this method requires the resource to be conducting, and thus may have limited application.

Although its potential was recognized during the late 70's, application of EM energy to mobilize heavy oils has yet to realize its potential. Problems include the high power costs, inefficient delivery of EM waves to the formation, and equipment failures.

Thus, what is needed in the art are improved methods of mobilizing heavy oil, that are more cost effective and have a smaller environmental impact than current methods.

SUMMARY OF THE DISCLOSURE

The invention generally relates to combining gas injection techniques with RF preheating. This technique is more efficient than steam injection techniques and avoids or at least minimizes the high cost and environmental impact of using steam. Further, the use of preheating with RF or other electromagnetic energy allows the efficient use of gas injection because the pre-heating brings the injection and producer wells into fluid communication, and thus gas injection (whichever type used) can be more effective. Further, since the method uses EM for a limited preheat, it is less energy intensive than using EM for oil mobilization and less likely to have equipment failure problems.

Both gas injection and EM heating have been used in various downhole applications, but to our knowledge EM preheating has never been applied with gas injection to improve production efficiencies by allowing EM energies to establish fluid communication between injection and production wells.

The invention more particularly includes improved gas injection oil recovery processes comprising one or more producer wells and one or more gas injector wells wherein injection of gas into said gas injector wells drives oil towards said producer wells for production of said oil, the improvement comprising preheating said oil with electromagnetic radiation so as to provide fluid communication between said production well and said injection well before or during said gas injection.

The electromagnetic energy can be provided by an AC current generator coupled via transmission lines to antennae placed downhole in an oil reservoir. The antennae can be in, near or between wells, but preferably collocate within wells or even be part of the well casings.

In preferred embodiments, the current generator provides alternating current to said antenna of radio frequencies. In other embodiments, microwave frequencies are used. In yet other embodiments, low frequencies are used.

In some embodiments, the antenna is a dipole antenna, and the antenna can be combined with the casing, e.g., if a conductive casing material is used, or if a conductive coating or wrapping is applied thereto. The antenna can also be a half dipole plus n antenna, wherein n is a integer from ≥0.

EM preheat occurs until fluid communication between injection and production well is achieved, but if desired EM heating can be used at later times as well.

Any suitable arrangement of wells can be used, but generally one or more production and injection wells are used, although injection wells can do service as production wells in some embodiments. The wells preferably include an array of wells, but this will vary with the geology of the reservoir and the gas injection or production techniques used.

In preferred embodiments, the production well is a horizontal well placed near the bottom of an oil reservoir, and the injection wells can be vertical wells surrounding the production well or horizontal wells above the production well and/or near the top of the pay zone. However, other well configurations can also be used.

The injected gas can be any suitable gas, including air, $CO_2$, $N_2$, methane, ethane, propane, butane, flue gas, or combinations thereof.

In other embodiments, the invention is method of enhanced oil recovery, comprising providing at least one production well and at least one injection well in a subterranean reservoir. At least one EM antenna is provided in said reservoir, and is configured to emit electromagnetic (EM) radiation to heat the reservoir hydrocarbons, so as to develop fluid communication between the production and injection wells. Then gas is injected into said subterranean reservoir sufficient to drive production of oil, and the resulting oil collected. The process can of course be repeated, and can also be accompanied by soak periods and/or water injection, as well as combined with the other production and drive methods known in the art.

The gas injection technique that is combined with EM establishment of fluid communication can be any gas injection technique, including but not limited to miscible gas injection, immiscible gas injection, enriched gas miscible processes, high pressure lean gas miscible processes, $CO_2$ flooding, $N_2$ flooding, gas cap, and combinations and variants of same.

For the purposes of this invention, the following definitions will be used. "Resistive heating" is 1 Hz-300 KHz. "RF heating" is 300 kHz to 300 MHz, and includes Medium, High and Very High bands. "MW heating" is 300 MHz to 300 GHZ.

The term "providing" in a claim is not meant to only include contemporaneous actions, but also includes the use of preexisting structures. Thus, "providing" a well does not only mean drilling of wells, but includes the use of existing wells.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The term "drive" when used in a claim is not intended to convey any particular mechanism of action, but only that oil is being moved towards a production well, whatever the mechanism.

It is important to note that the herein described various mechanisms of action serve only as the currently understood explanation thereof and may not be complete or accurate in all respects. Thus, the mechanism of action is not intended to be limiting of the appended claims, unless such language is specifically included therein.

The following abbreviations are used herein:

| ABBREVIATION | TERM |
|---|---|
| API | American Petroleum Institute |
| EM | Electromagnetic |
| GAGP | Gas assisted gravity production |
| MW | Microwave |
| OOIP | Original Oil In Place |
| RF | Radio Frequency |
| WAG | Water and Gas |
| PV | Pore volume |

BRIEF DESCRIPTION OF THE DRAWINGS

A more complete understanding of the present invention and benefits thereof may be acquired by referring to the follow description taken in conjunction with the accompanying drawings in which:

FIG. 11a-e illustrates various antenna and well configurations for the RF gas drive recovery process. FIG. 11f-j illustrates various antenna and well configurations for the RF gas cap recovery process.

DETAILED DESCRIPTION

Figure 1:
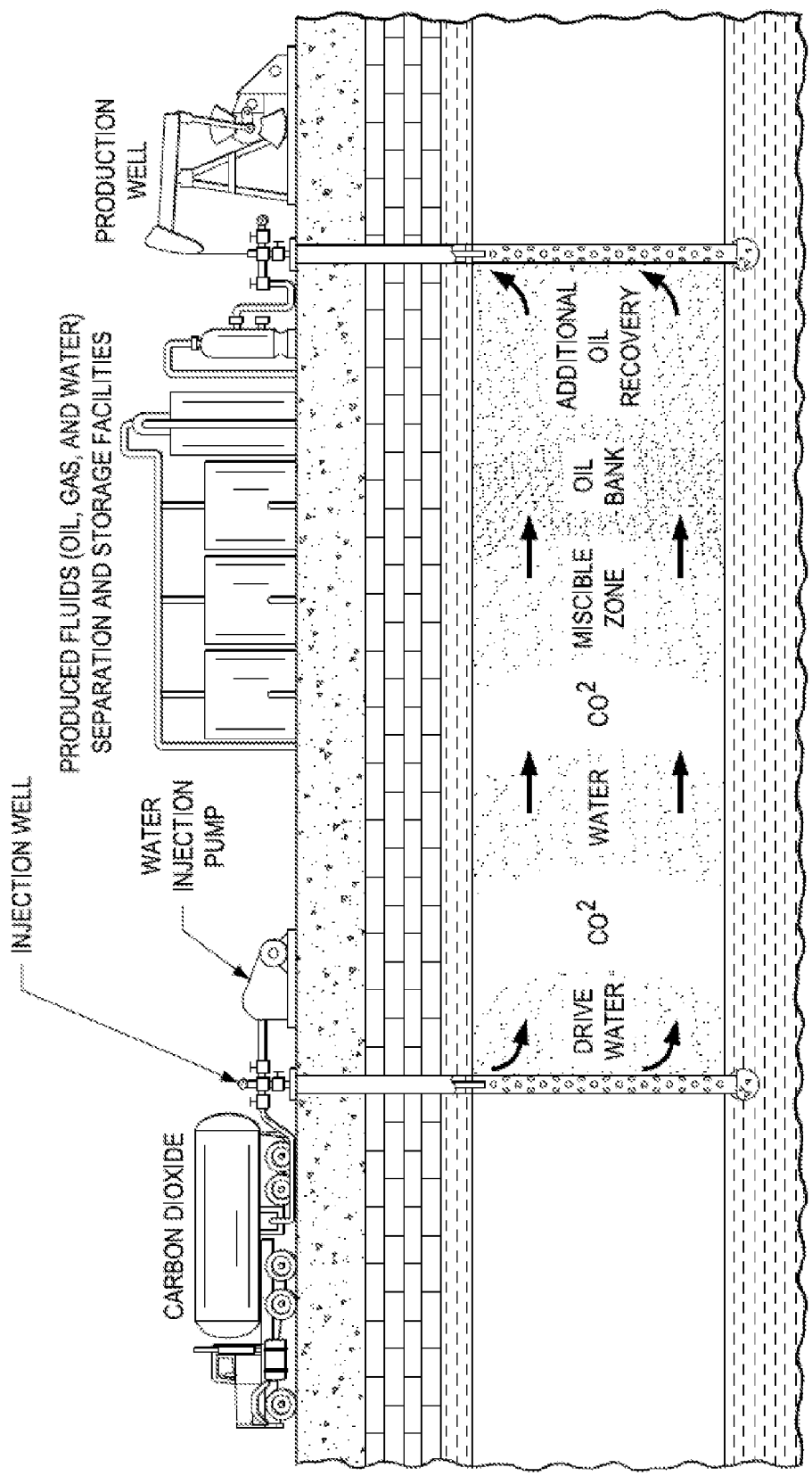
FIG. 1 is a carbon dioxide flooding. This method is a miscible displacement process applicable to many reservoirs. A $CO_2$ slug followed by alternate water and $CO_2$ injections (WAG) is usually the most feasible method.

This invention uses electromagnetic radiation to heat a heavy oil reservoir followed by gas injection. Fluids that are immobile at initial reservoir conditions can be heated with electromagnetic radiation to allow pressure communication across the reservoir. Once sufficient mobility is achieved, injected gas can be used to mobilize the heavy oil in any of the gas injection techniques available in the art or to be developed.

The invention provides one or more embodiments, or any combination of embodiments, as described below:

An improved gas injection oil recovery process comprising one or more producer wells and one or more gas injector wells, wherein injection of gas into said gas injector wells drives oil towards said producer wells for production of said oil, the improvement comprising preheating oil with electromagnetic radiation so as to provide fluid communication between said production well and said injection well before or during said gas injection.

An improved gas injection oil recovery process comprising injecting gas into a reservoir to drive oil towards one or more producer wells for production of said oil, the improvement comprising EM preheating said oil before or during said gas injection.

Gas injection can be at any suitable pressure, including is at a pressure above the minimum miscibility pressure (MMP), and below same.

Any suitable gas can be used, including air, $CO_2$, $N_2$, methane, ethane, propane, butane, flue gas, or combinations thereof.

The injector and producer wells can be in any known or to be invented configurations, including wherein one or more producer wells are horizontal; wherein said gas injection provides a gas cap to maintain reservoir pressure while oil gravity drains to said production well; wherein the injection wells are vertical; wherein the injection wells are vertical and surround one or more production wells; wherein injection wells are horizontal; wherein injection wells are horizontal and above production wells; wherein 5 spot or 7 spot patterns are used; wherein regular arrays of wells are used; wherein staggered arrays of wells are used; and the like.

The electromagnetic energy can provided by RF generator coupled via transmission lines to one or more antennae placed downhole in an oil reservoir. Antenna design can vary, and includes any known or invented antenna design, such as a dipole antenna, a half dipole plus n antenna, wherein n is a integer from ≥0; and the like.

Antenna placement can vary, including wherein said one or more antennae are positioned at or between wells; wherein said antennae are positioned on some or each injection well and some or each production well; and combinations thereof.

The electromagnetic radiation can be any suitable frequency, including being generated by radio frequencies, microwave frequencies, combinations of frequencies, and the like.

A method of enhanced oil recovery in another embodiment, comprises providing at least one production well and at least one injection well in a subterranean reservoir containing heavy oil; providing at least one antenna in said subterranean reservoir, wherein said antenna is electrically connected to a current generator; emitting electromagnetic (EM) radiation from said antenna to develop fluid communication between said production well and said injection well; injecting gas into said injection well at a pressure sufficient to drive production of said heavy oil from said production well; and producing said heavy oil via said production well.

The method can be combined with any enhanced oil recovery technique, including steam injection, gravity drive, in situ combustion, gas lift, gas cap, soak periods, cycles thereof, and/or combinations thereof.

In another embodiment, a method of enhanced oil recovery is provided, comprising providing at one or more production wells and one or more injection wells in a subterranean reservoir containing heavy oil; providing at least one antenna in each of said wells, wherein said antenna is electrically connected to a current generator capable of providing alternating current at radio frequencies (RF); emitting RF radiation from said antenna for a time sufficient to develop fluid communication between said one or more production wells and said one or more injection wells; injecting a gas into said one or more injection wells at a pressure sufficient to drive production of said heavy oil from said one or more production wells; and producing said heavy oil via said one or more production wells.

FIG. 1 shows $CO_2$ flooding. When pressure in a candidate reservoir has been depleted through primary production and possibly water flooding, it must be restored before $CO_2$ injection can begin. To do this, normally water is pumped into the reservoir through injection wells until pressure reaches a desired level, then $CO_2$ is introduced into the reservoir through these same injection wells.

Even though $CO_2$ is not miscible with oil on first contact, when it is forced into a reservoir a miscible front is generated by a gradual transfer of smaller, lighter hydrocarbon molecules from the oil to the $CO_2$. This miscible front is in essence a bank of enriched gas that consists of $CO_2$ and light hydrocarbons. Under favorable conditions of pressure and temperature, this front will be soluble with the oil, making it less viscous and easier to move toward production wells.

This initial $CO_2$ slug is typically followed by alternate water and $CO_2$ injection—the water serving to improve sweep efficiency and to minimize the amount of $CO_2$ required for the flood, but this may not be necessary in gravity based techniques.

Production will be from an oil bank that forms ahead of the miscible front. On the surface, the $CO_2$ can be separated from the produced fluids and may be reinjected, helping to reduce the amount of new $CO_2$ required for the project. Thus, the $CO_2$ can be both recycled and sequestered underground, reducing our overall carbon footprint. This procedure may be repeated until oil production drops below a profitable level.

Figure 2:
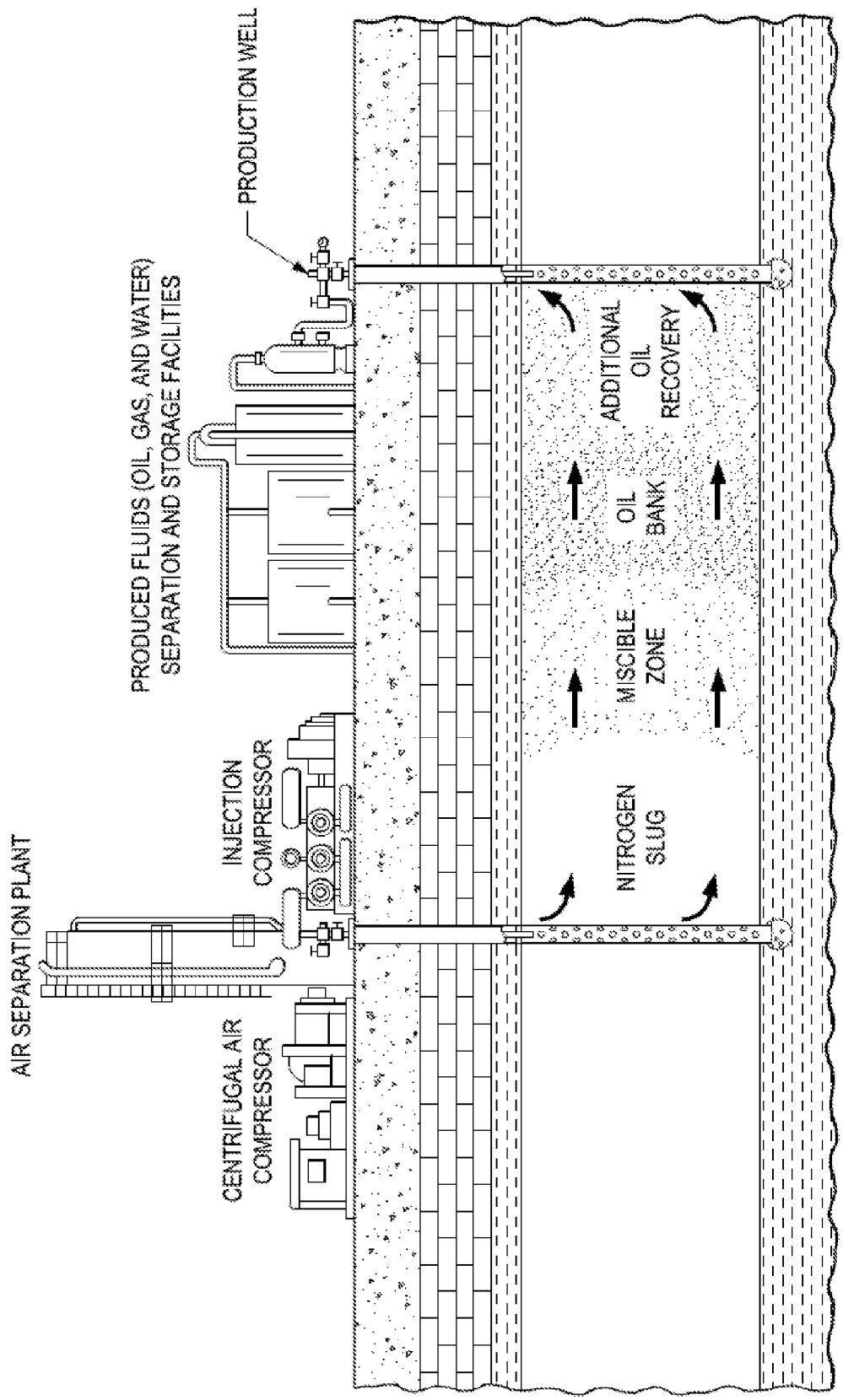
FIG. 2 is a nitrogen flooding schematic.

FIG. 2 shows nitrogen flooding. Gaseous nitrogen ($N_2$) is attractive for flooding because it can be manufactured on site at less cost than other alternatives. Since it can be extracted from air by cryogenic separation, there is an unlimited source, and being completely inert it is noncorrosive.

In general, when nitrogen is injected into a reservoir, it forms a miscible front by vaporizing some of the lighter components from the oil. This gas, now enriched to some extent, continues to move away from the injection wells, contacting new oil and vaporizing more components, thereby enriching itself still further. As this action continues, the leading edge of this gas front becomes so enriched that it goes into solution, or becomes miscible, with the reservoir oil. At this time, the interface between the oil and gas disappears, and the fluids blend as one.

Continued injection of nitrogen pushes the miscible front (which continually renews itself) through the reservoir, moving a bank of displaced oil toward production wells. Water slugs are injected alternately with the nitrogen to increase the sweep efficiency and oil recovery. At the surface, the produced reservoir fluids may be separated, not only for the oil but also for natural gas liquids and injected nitrogen.

Figure 3:
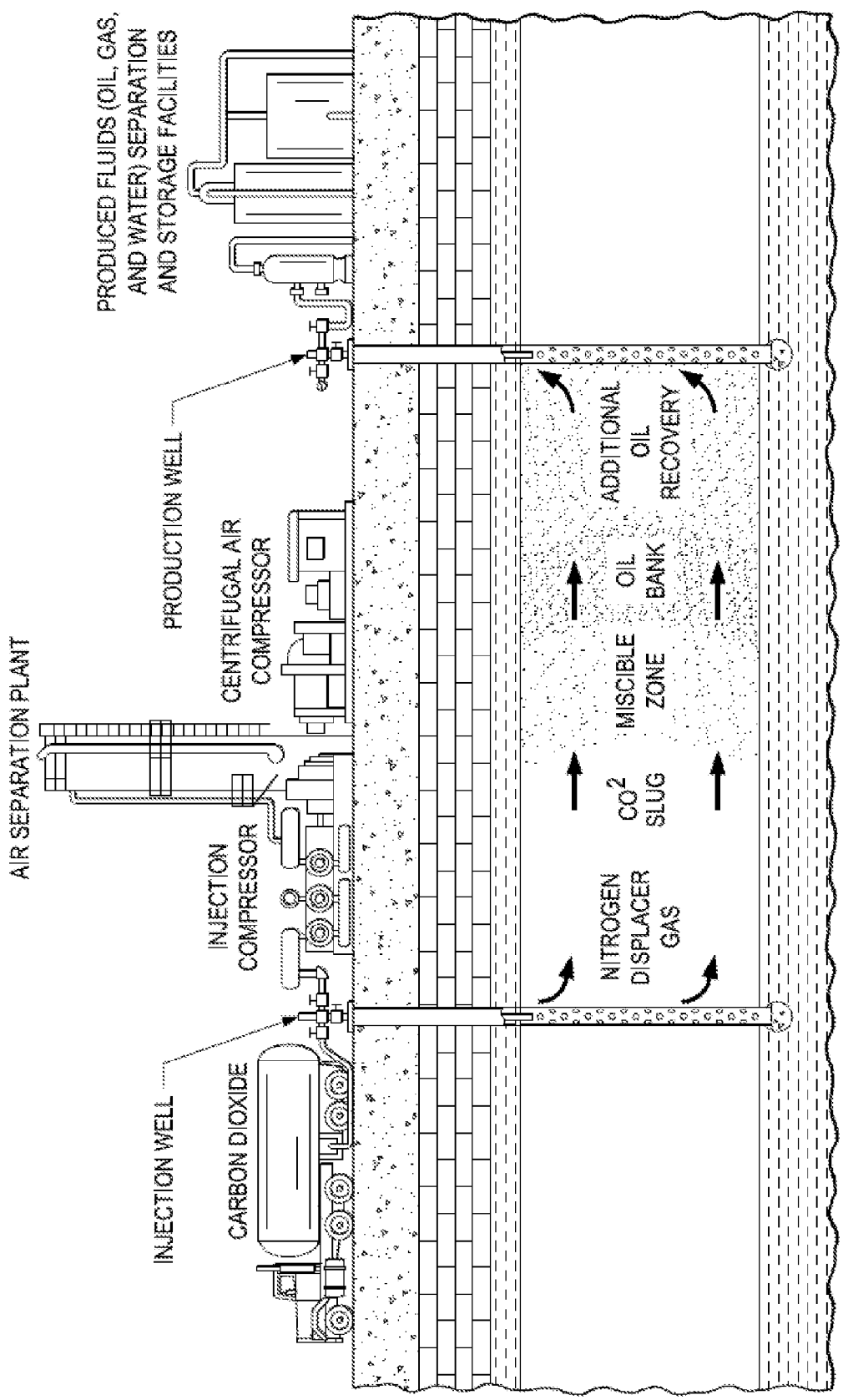
FIG. 3 is a combined nitrogen/carbon dioxide flooding schematic.

FIG. 3 shows combined nitrogen and carbon dioxide flooding, which can be more cost effective than $CO_2$ alone because the nitrogen can be made onsite. In applying the process, nitrogen is injected into the reservoir to displace the $CO_2$ slug and its associated oil bank.

Figure 4:
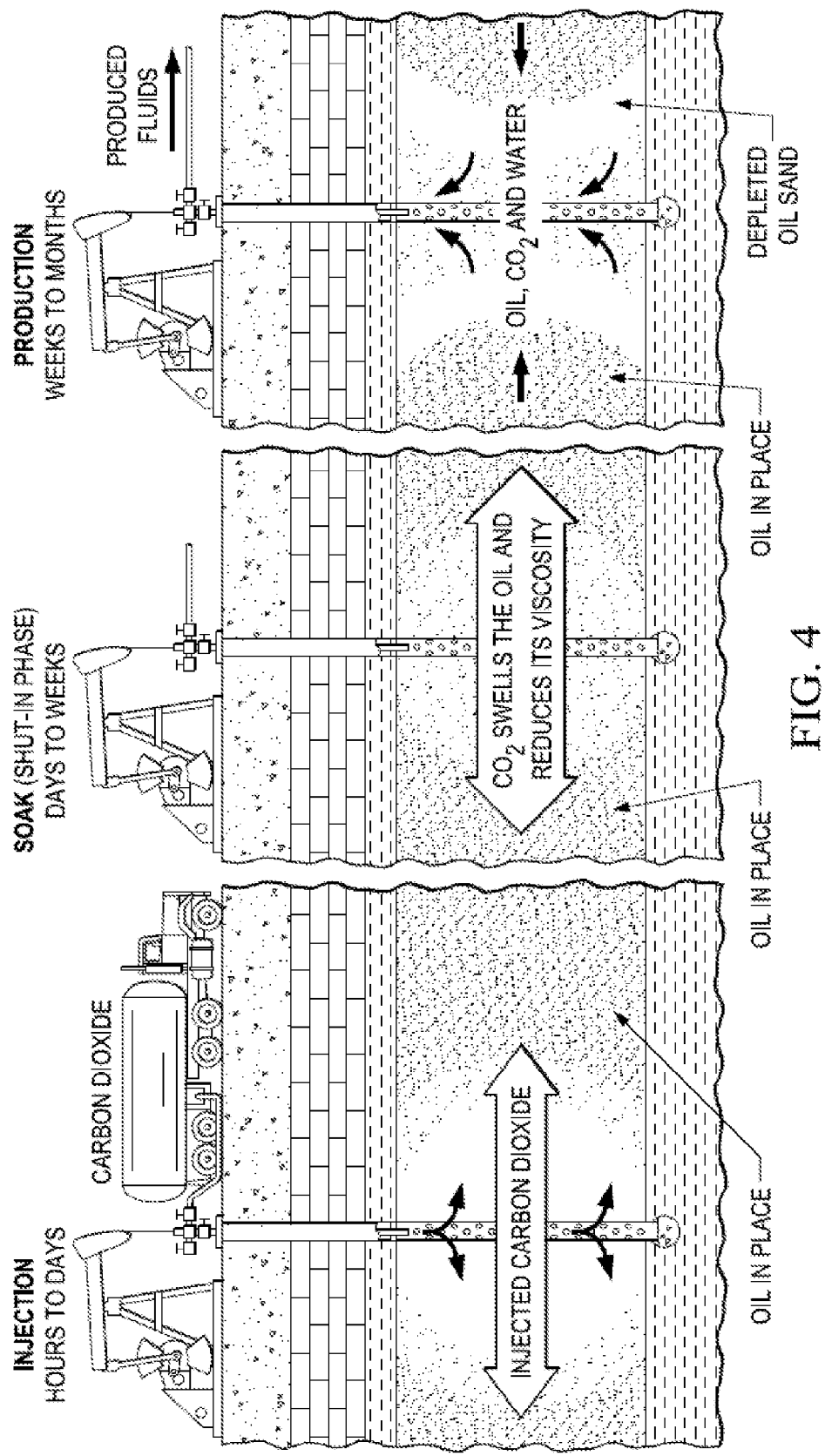
FIG. 4 is a cyclic carbon dioxide flooding schematic.

FIG. 4 shows cyclic carbon dioxide flowing, which is similar in operation to the conventional cyclic or "huff-and-puff" steam injection process. $CO_2$ is injected into a well drilled into an oil reservoir, the well is shut-in for a time providing for a "soak period," then is opened, allowing the oil and fluids to be produced.

Although FIGS. 1-4 show vertical wells, the same process can be used with horizontal wells, e.g., paired horizontal wells where oil gravity drains to the lower production well and one or more injection wells are placed near the top of the reservoir. Alternatively, a lower production well can be surrounded by a plurality of vertical injection wells.

Figure 5:
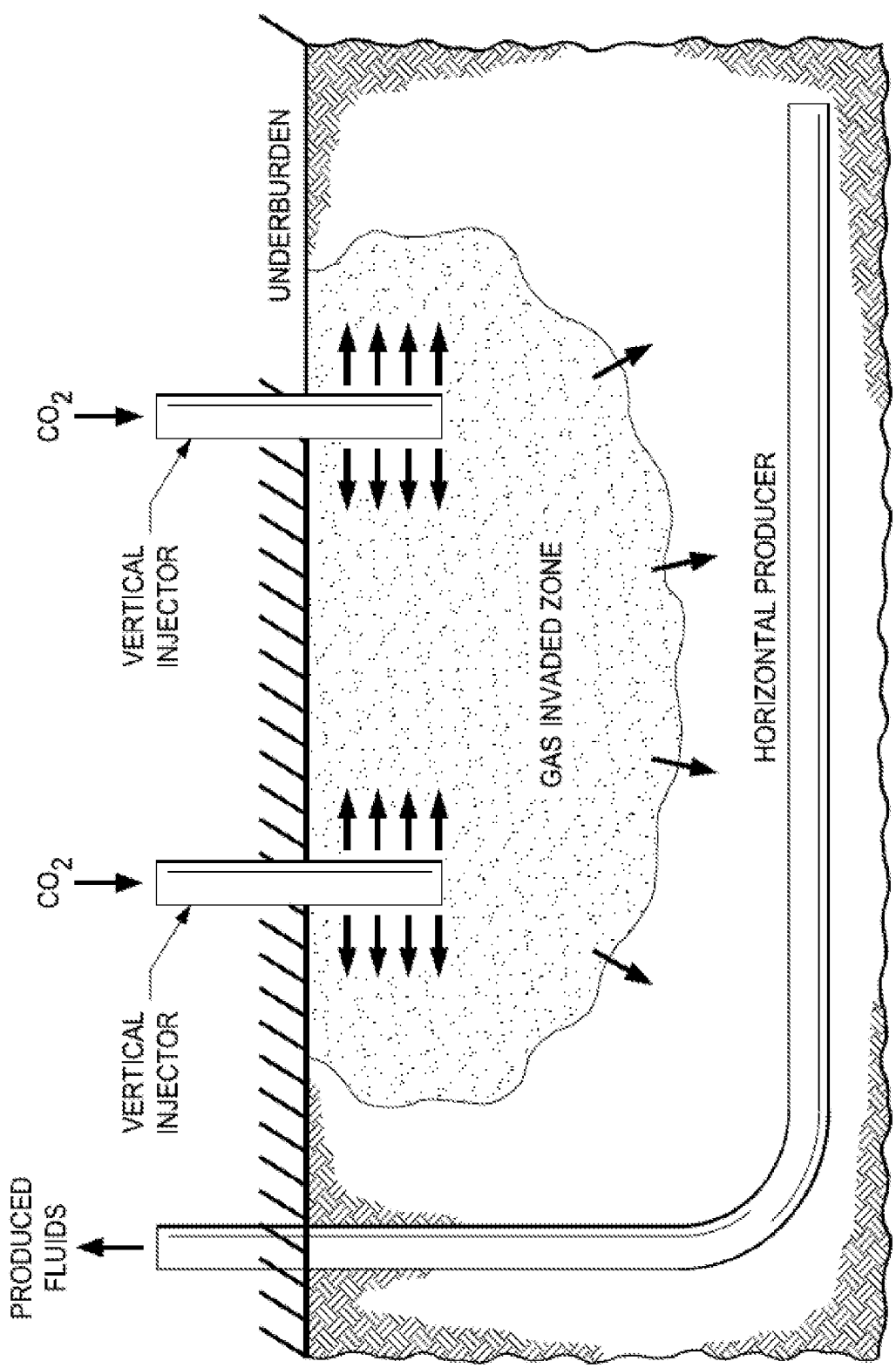
FIG. 5 shows gas assisted gravity drainage, using vertical gas injection wells and a horizontal producer well. Although not shown herein, antennae can be placed at one or more wells, or between wells to allow for an EM preheating of the reservoir. The material components of a well can be designed/constructed to serve as both an antenna and for injection and production.

An improvement of a basic gas injection technique is shown in FIG. 5, which illustrates gas assisted gravity drainage or "GAGD." $CO_2$ injected in vertical wells accumulates at the top of the pay zone and displaces oil, which drains to a horizontal producer straddling one or more injection wells. As injection continues, the $CO_2$ chamber grows downward and sideways, resulting in larger portions of the reservoir being swept without any increase in water saturation in the reservoir. The gravity segregation of $CO_2$ also helps in delaying, or even eliminating, $CO_2$ breakthrough to the producer as well as preventing the gas phase from competing for flow with oil. The gas injection wells do not have to be vertical, as shown in FIG. 5, but could also be horizontal wells placed near the top of a pay zone, thus pushing oil towards the horizontal production well at the bottom of the pay zone. The RF antennae (not shown) can be placed on one or more of these wells or between wells, as shown in FIG. 11.

Figure 6:
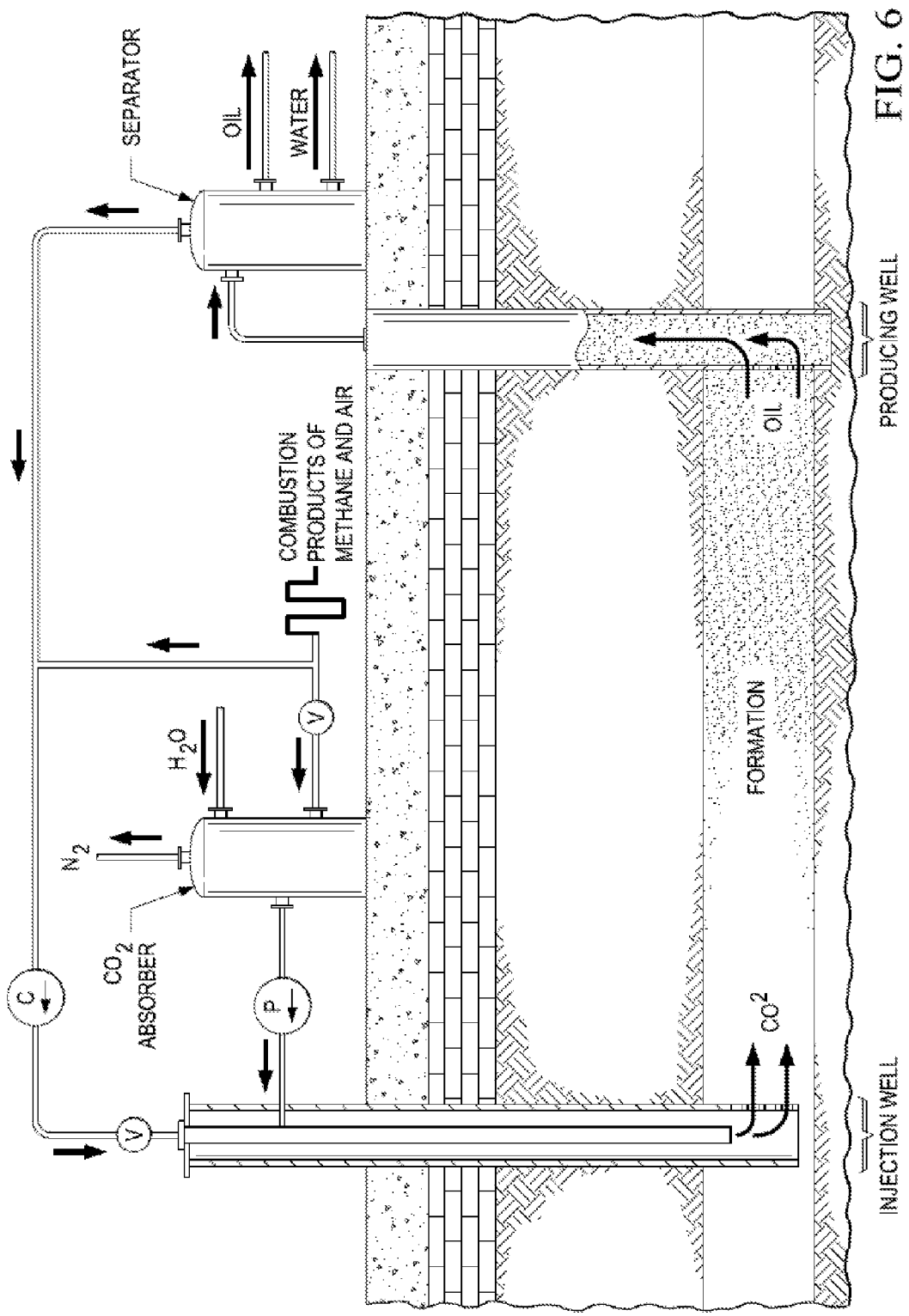
FIG. 6 is a graphic showing the conventional gas drive operation.

FIG. 6 shows another conventional gas drive operation, wherein the inventive improvement comprises preheating with RF (antennae not shown), thus allowing gas injectivity in a heavy oil reservoir. This preheating allows solution gas drive and gas injection mechanisms to be used in heavy oil reservoirs, which without said preheating would normally be too viscous for gas injection techniques to work to any degree of efficiency.

Figure 7:
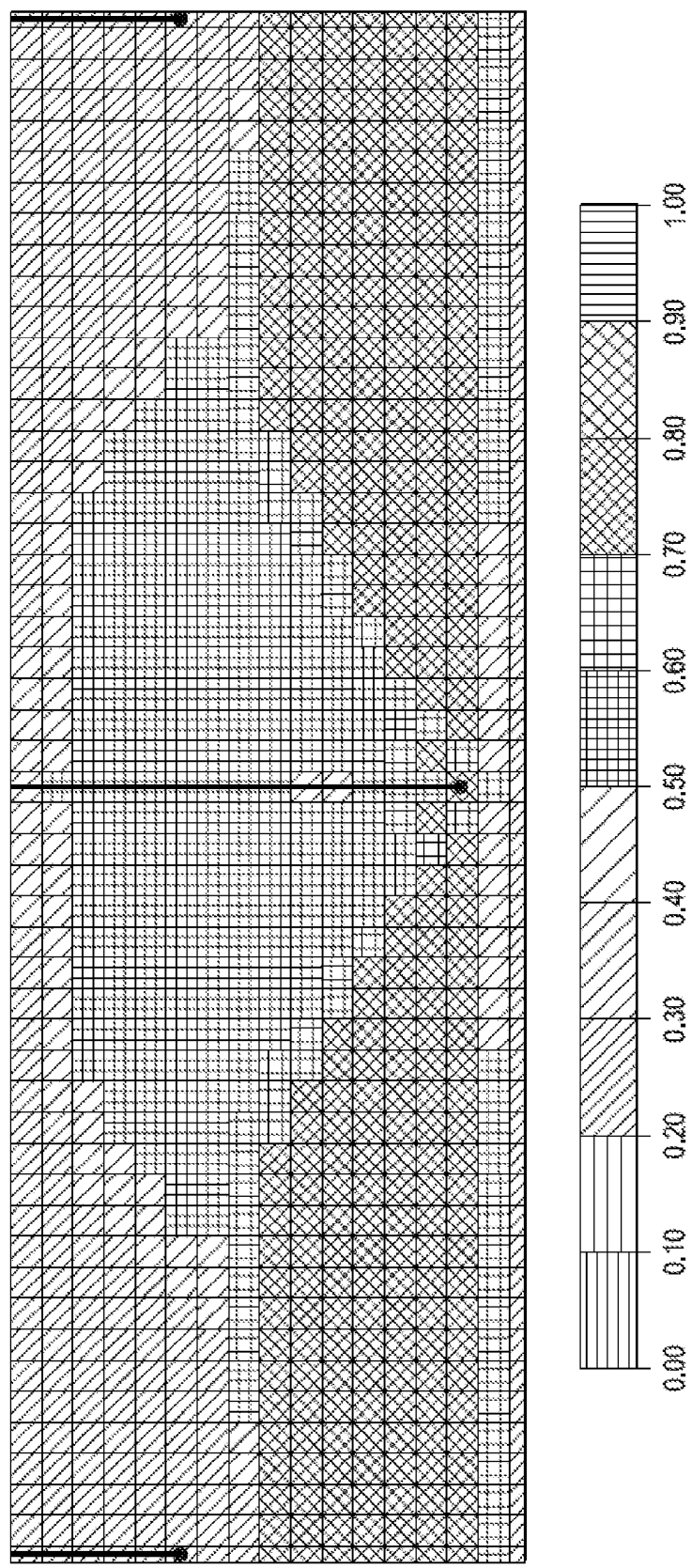
FIG. 7 is a graphic showing oil saturation in the reservoir during gas cap creation. The central lower production well is surrounded by a pair of injection wells, in this case shown higher but not necessarily so. Further, injection wells can function as producers during the pre-heating period.

FIG. 7 shows a numerical simulation of a RF gas cap process in an Athabasca type reservoir. This particular graphic shows oil saturation after the gas cap has formed in the reservoir. In this case, two horizontal wells are drilled near the top of the formation fifty meters apart. A producer is drilled half way in between the two injectors near the bottom of the oil-bearing formation. Each of the three wells is equipped with a RF antenna for heating the formation. RF heating commences and bitumen is mobilized around all three wells until enough heat is transferred to the reservoir to create mobility or fluid communication between the wells. Once communication is established, gas injection begins and creates a gas cap at the top of the reservoir. Injected gas can be any pure gas or mixture of gases, but in this simulation, methane was used to create the gas cap.

This graphic shows oil saturation after start of gas injection—in this case, simulation was used to mimic 2 years of RF heating followed by methane injection of a 2D sector model of an offset injector producer development as shown in FIG. 11g. Each grid block is 1 meter by 1 meter. Injection wells are located top right and left with a producer located bottom middle. Cell hatching represents oil saturation. Oil is being pushed toward production well by the injected gas. Initially all cells are at an initial oil saturation of 60-70% with 30 to 40% water except for the bottom two rows which are at a higher initial water saturation. After two years of heating followed by methane gas injection, oil from the upper sections have been displaced into the producer as shown by the change in oil saturation. Methane has replaced the displaced oil.

Figure 8:
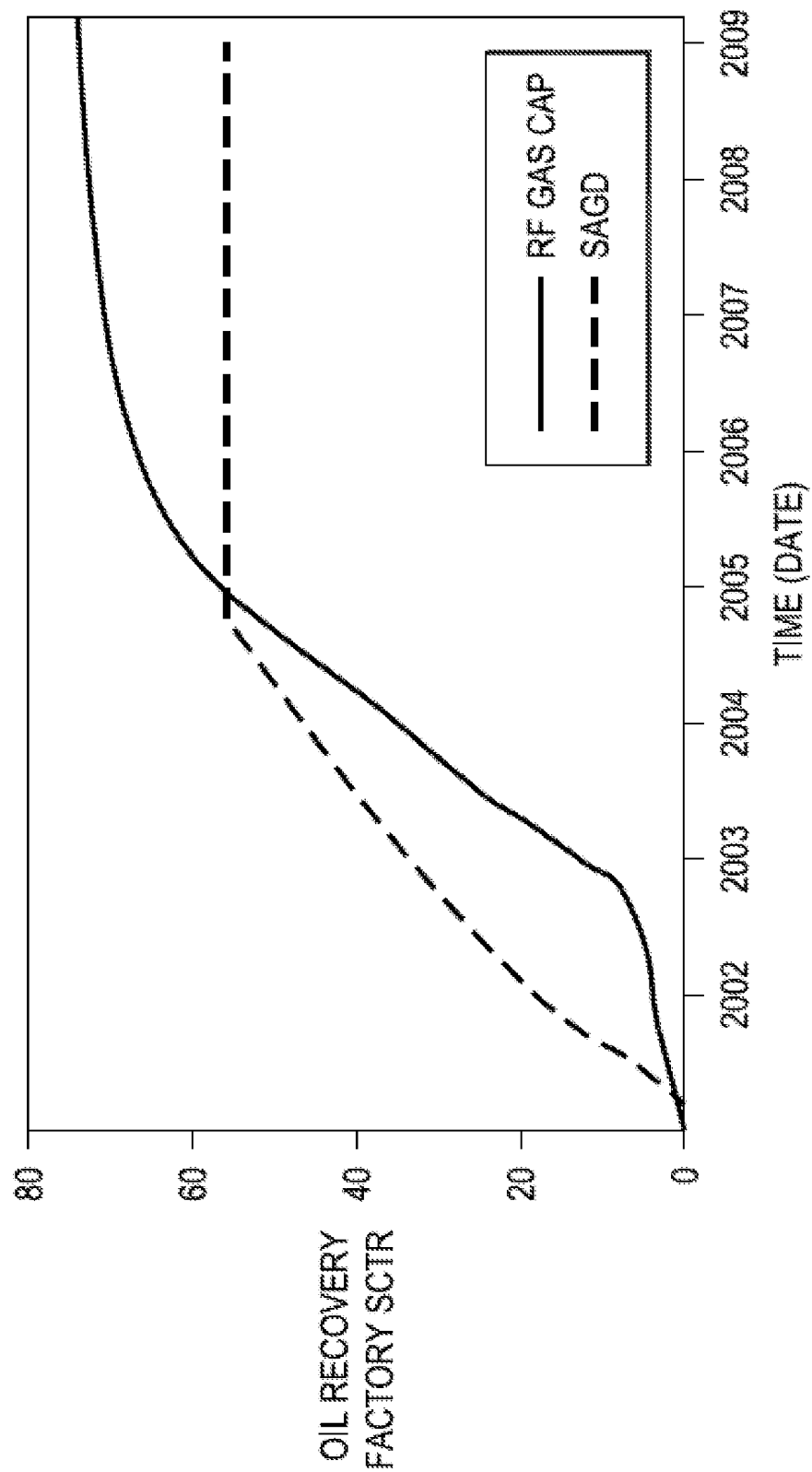
FIG. 8 is a comparison of oil recovery factor between a SAGD and RF gas cap process. The X axis is time in years, and the Y axis is the oil recovery factor for the sector (SCTR). This data is from the simulation model in FIG. 6 graphed against the same sector model using SAGD as the recovery process. The data was generated using CMG's STARS™ thermal simulator.

FIG. 8 shows oil recovery in simulated experiments comparing steam assisted gravity drainage (SAGD) with the RF and gas injection method of FIG. 7, and indicates that a much greater recovery is possible with the combined technique.

Figure 9:
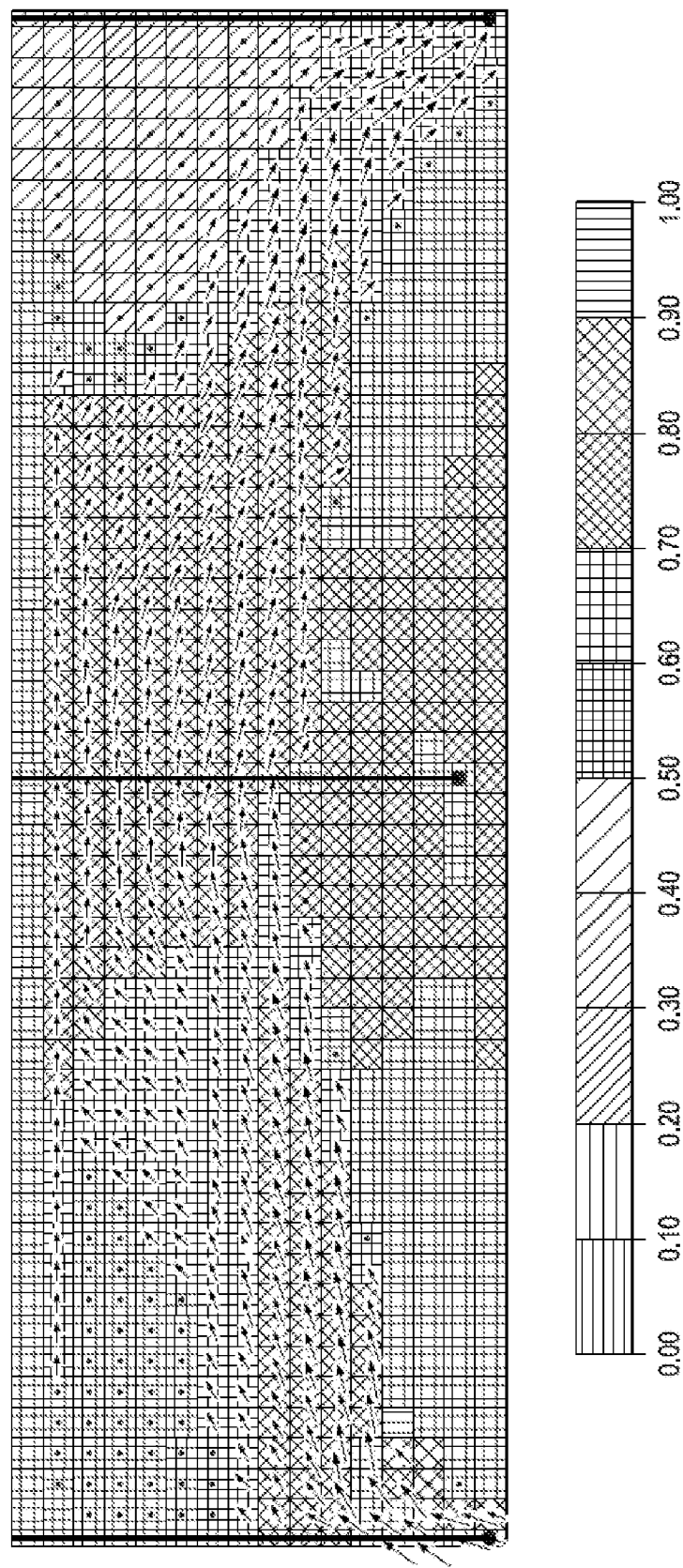
FIG. 9 is a graphic showing oil saturation in the reservoir during gas drive with three horizontal wells, two positioned lower than a central, higher horizontal well. In this embodiment, gas can sweep oil to the right, first being produced at the higher production well by taking advantage of gas expansion and lift. Later, the central well can be shut in, and the remaining oil gravity drain to the lower production well (right).

FIG. 9 shows a numerical simulation of a RF gas drive in an Athabasca type reservoir. In this case, two horizontal wells are drilled near the bottom of the formation fifty meters apart. A third is positioned at a higher elevation and at the midspan between the lower wells. Each of the wells is equipped with a RF antenna for heating the formation. In this figure, 2 years of RF heating is simulated, followed by nitrogen injection. Cell hatching represents oil saturation.

Initially all cells are at an initial oil saturation of 50-80% with 20 to 40% water. After two years of heating followed by nitrogen gas injection, oil in the flow path between the bottom-left injection well and the top-middle production well (see arrows) have been displaced into the producer as shown by the change in oil saturation. Nitrogen has replaced the displaced oil.

To iterate, RF heating commences and initially bitumen may be produced from each well via gravity drainage until enough heat is transferred to the reservoir to create mobility between the wells. Once pressure communication is established, gas injection occurs and drives the mobile oil before it. Injected gas can be any pure gas or mixture of gases. Nitrogen is used in this simulation. Once injection commences, the oil around the injection well becomes lighter and less viscous, and at the same time the pressure is building up around the injection well. When the central production well is later opened, the higher pressure around the injection well pushes the hydrocarbons toward the lower-pressure production well.

Closer to the production well, the dissolved/mixed gas within the hydrocarbon starts to expand, partly because the elevation within the formation and partly because of the pressure drop at the production well. This gas expansion can also assist with lift. The gas pressure of the injected gas is maintained such that sufficient gas is dissolved or mixed in the hydrocarbons for gas drive purposes, but not oversaturate the hydrocarbon as to create a gas cap. In other embodiments, a gas cap is used for part of the drive mechanism.

In one embodiment, the pressure is maintained at about 400 to 3500 p.s.i, preferably at about 400-1000 p.s.i, but the preferred range will be formation dependant. The amount of gas injected will depend upon formation conditions, the composition of the gas mixture, and the composition of the reservoir fluid. For example, if the injected gas is carbon dioxide, amount of $CO_2$ in the range of about 500 to 3500 s.c.f./barrel of oil-in-place can be used.

The method can be combined with a second lower production well. Thus, the method can be combined with gravity drive mechanisms. The central well can be shut in and any remaining oil gravity drain to the lower well as shown in FIG. 9.

Figure 10:
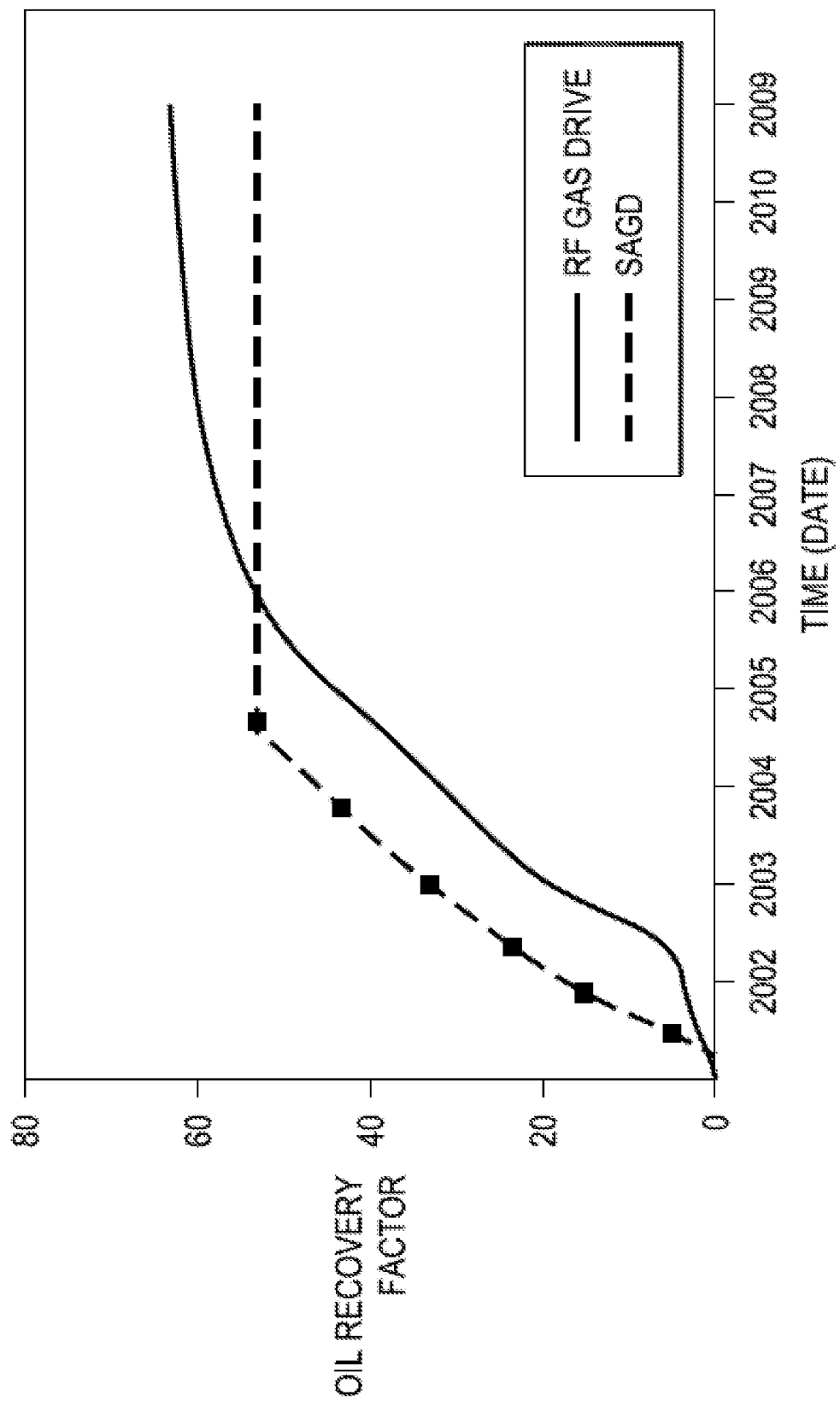
FIG. 10 is a comparison of oil recovery factor between a SAGD and RF gas drive process. The A axis is time in years, and the Y axis is the oil recovery factor for the sector (SCTR). This data is from the simulation model in FIG. 9 graphed against the same sector model using SAGD as the recovery process. The data was generated in part using CMG's STARS™ thermal simulator.

FIG. 10 shows the production profile predicted by a numerical simulation of the method depicted in FIG. 9 compared to SAGD. While initially lagging behind a SAGD development the RF GAS DRIVE process results in a net increase in production. Further optimization of this process can yield even higher percentage recovery.

FIG. 11 shows the configuration of antennae, injection well and production wells suitable for various gas injection processes. Each subfigure represents a cross section of the pay zone with the axis of a horizontal well running perpendicular to the page.

As can be seen, antenna can be placed near or on the side of any well or can be placed between wells. Further, producers can be surrounded by injectors or not, and can be above, below or at the same depth as injectors. In preferred embodiments, the producers are below the injectors, so the method can take advantage of gravity drainage and or gas cap techniques. In other embodiments, at least one producer may be higher, to take advantage of gas expansion lift techniques, in yet others, horizontal sweeps are intended.

Although FIG. 11 shows only 3 wells in each panel, the principles can be applied to five-spot or seven-spot patterns, or reverse patterns, and to line drive or staggered line drive and other well patterns as well.

Environmental regulations for the use of water to produce oil from heavy oil reservoirs are poised to get more stringent in the future. The process described herein will significantly reduce or even eliminate the need for source water in bitumen or heavy oil production, and thus may be particularly advantageous.

It will also reduce the capital expenses for setting up a bitumen recovery plant, because there will be no need for water treatment or steam generation facilities for this process.

This method is also advantageous in thin pay zones since the primary recovery drive mechanism is displacement as opposed to gravity drainage. Gravity drainage processes are disadvantaged in thin pay zones since they require a vertical head to drive the process, which by definition is thin in thin pay zones.

This invention will allow production from heavy oil and bitumen reservoirs that are currently considered uneconomic, reduce environmental impact by eliminating the need for source water for steam generation, and reduce capital costs for bitumen production facilities by removing water treatment and steam generation capabilities.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. An improved gas injection oil recovery process comprising one or more producer wells and one or more gas injector wells, wherein injection of a gas into said gas injector wells drives oil towards said one or more producer wells for production of said oil, the improvement comprising preheating said oil with electromagnetic radiation so as to provide fluid communication between said producer well and said injection well before said gas injection; wherein said electromagnetic energy is provided by RF generator coupled via transmission lines to one or more antennae placed downhole in an oil reservoir, wherein at least one of said one or more antennae is located between wells, and wherein said gas is selected from the group consisting of air, $CO_2$, $N_2$, methane, ethane, propane, butane, flue gas and combinations thereof, and wherein said injected gas remains in the reservoir for the duration of the oil recovery process.

2. The improved gas injection oil recovery process of claim 1, wherein said gas injection is at a pressure above the minimum miscibility pressure (MMP).

3. The improved gas injection oil recovery process of claim 1, wherein said gas injection is at a pressure below the MMP.

4. The improved gas injection oil recovery process of claim 3, wherein said one or more producer wells are horizontal, and wherein said gas injection provides a gas cap to maintain reservoir pressure while oil gravity drains to said producer well.

5. The improved gas injection oil recovery process of claim 1, wherein said antennae are positioned on each injection well and each producer well.

6. The improved gas injection oil recovery process of claim 1, wherein said electromagnetic radiation is generated by radio frequencies.

7. The improved gas injection oil recovery process of claim 1, wherein said producer well is a horizontal well placed near the bottom of an oil reservoir.

8. The improved gas injection oil recovery process of claim 1, wherein said injection well is a horizontal well placed near the top of said oil reservoir.

9. The improved gas injection oil recovery process of claim 1, wherein said injection well is a plurality of vertical injection wells surrounding a production zone of a producer well.

10. A method of gas-assisted gravity drainage enhanced oil recovery, comprising:
  i) providing at least one production well and at least one injection well in a subterranean reservoir containing heavy oil;
  ii) providing at least one antenna in said subterranean reservoir in between said production well and said injection well, wherein said antenna is electrically connected to a current generator that generates radio frequencies (RF) energy;
  iii) emitting electromagnetic (EM) radiation from said antenna to develop fluid communication between said production well and said injection well and for preheating the heavy oil in the reservoir;
  iv) injecting gas into said injection well at a pressure sufficient to drive production of said heavy oil from said production well, wherein said gas is selected from the group consisting of air, $CO_2$, $N_2$, methane, ethane, propane, butane, flue gas and combination thereof; and v) producing said heavy oil via said production well,
wherein said injected gas remains in the reservoir for the duration of the oil recovery process.

11. The method of enhanced oil recovery in claim 10, wherein said current generator provides alternating current to said antenna of radio frequencies.

12. The method of enhanced oil recovery in claim 10, wherein said antenna is a dipole antenna.

13. The method of enhanced oil recovery in claim 10, wherein said antenna is a half dipole plus n antenna, wherein n is a integer from ≥0.

14. The method of enhanced oil recovery in claim 10, wherein said at least one production well is at least one horizontal production well placed near the bottom of said subterranean reservoir.

15. The method of enhanced oil recovery in claim 14, wherein said at least one injection well is at least one horizontal injection well placed near the top of said subterranean reservoir.

16. The method of enhanced oil recovery in claim 10, wherein said at least one injection well is at least one horizontal injection well placed near the top of said subterranean reservoir.

17. The method of enhanced oil recovery in claim 10, wherein said at least one injection well is at least one vertical injection well.

18. The method of enhanced oil recovery in claim 10, further combined with steam injection, gravity drive, in situ combustion, soak periods or combinations thereof.

19. A method of enhanced oil recovery, comprising:
i) providing at one or more production wells and one or more injection wells in a subterranean reservoir containing heavy oil;
ii) providing at least one antenna in each of said wells, wherein said antenna is electrically connected to a current generator capable of providing alternating current at radio frequencies (RF);
iii) emitting RF radiation from said antenna for a time sufficient to develop fluid communication between said one or more production wells and said one or more injection wells before gas injection;
iv) injecting a gas into said one or more injection wells at a pressure sufficient to drive production of said heavy oil from said one or more production wells,
wherein said gas comprises air, $CO_2$, $N_2$, methane, ethane, propane, butane, flue gas, or combinations thereof; and
v) producing said heavy oil via said one or more production wells,
wherein the injected gas remains in the reservoir for the duration of the oil recovery process.

20. The method of enhanced oil recovery of claim 19, wherein said pressure is above the MMP of said gas.

21. The method of enhanced oil recovery of claim 19, wherein said pressure is below the MMP of said gas.

22. The method of enhanced oil recovery of claim 19, wherein said pressure is below the MMP of said gas and said gas injection is a gas cap process to maintain reservoir pressure support.

23. The method of enhanced oil recovery of claim 19, wherein said pressure is above the MMP of said gas and said gas injection is a miscible gas drive process.

* * * * *